(12) United States Patent
Poulsen et al.

(10) Patent No.: US 8,977,401 B2
(45) Date of Patent: Mar. 10, 2015

(54) LIFETIME OPTIMIZATION OF A WIND TURBINE GENERATOR BY CONTROLLING THE GENERATOR TEMPERATURE

(75) Inventors: Borge Poulsen, Norager (DK); Peter de Place Rimmen, Hammel (DK)

(73) Assignee: Vestas Wind Systems A/S, Aarhus N (DK)

( * ) Notice: Subject to any disclaimer, the term of this patent is extended or adjusted under 35 U.S.C. 154(b) by 704 days.

(21) Appl. No.: 12/747,776

(22) PCT Filed: Nov. 18, 2008

(86) PCT No.: PCT/DK2008/000408
§ 371 (c)(1),
(2), (4) Date: Jun. 11, 2010

(87) PCT Pub. No.: WO2009/076955
PCT Pub. Date: Jun. 25, 2009

(65) Prior Publication Data
US 2010/0270798 A1    Oct. 28, 2010

Related U.S. Application Data

(60) Provisional application No. 61/014,374, filed on Dec. 17, 2007.

(30) Foreign Application Priority Data

Dec. 14, 2007   (DK) .................................. 2007 01786

(51) Int. Cl.
*F03D 7/04* (2006.01)
*H02P 9/04* (2006.01)
(Continued)

(52) U.S. Cl.
CPC ............... *H02P 9/04* (2013.01); *F03D 7/0224* (2013.01); *F03D 7/044* (2013.01); *H02P 9/14* (2013.01);
(Continued)

(58) Field of Classification Search
USPC ....................... 700/287; 290/44, 55
See application file for complete search history.

(56) References Cited

U.S. PATENT DOCUMENTS 7,498,775 B2 * 3/2009 Swahn et al. ................... 322/24
2001/0029434 A1 10/2001 Hofmann et al.
(Continued)

FOREIGN PATENT DOCUMENTS

DE    196 34 464    4/1997
EP    1 508 951    2/2005
(Continued)

OTHER PUBLICATIONS

English Machine Translation of Kloft DE 19634464.*
(Continued)

*Primary Examiner* — Ryan Jarrett
(74) *Attorney, Agent, or Firm* — Patterson & Sheridan, LLP

(57) ABSTRACT

A wind turbine and a method for controlling the temperature of a wind turbine generator are disclosed, the wind turbine comprising a generator, generator temperature control means and means for providing input representative of at least one temperature of the generator to the generator temperature control means, the generator temperature control means including a closed-loop regulation arranged to determine a deviation of the input from at least one desired value, compute the magnitude of at least one control output in dependency of the determined deviation, and feed the control output to at least one controller of the wind turbine in order to reduce the deviation, the controller comprising control means for controlling the operation of the wind turbine in response to the at least one control output by changing one or more operational parameters of the wind turbine, which parameters influence the at least one temperature of the generator.

11 Claims, 8 Drawing Sheets

(51) Int. Cl.
*F03D 7/02* (2006.01)
*H02P 9/14* (2006.01)
*H02P 9/00* (2006.01)

(52) U.S. Cl.
CPC ....... *F05B 2220/704* (2013.01); *F05B 2260/80* (2013.01); *F05B 2260/821* (2013.01); *F05B 2270/303* (2013.01); *F05B 2270/3032* (2013.01); *H02P 2009/004* (2013.01); *Y02E 10/723* (2013.01)
USPC .............................. 700/287; 290/44; 290/55

(56) References Cited

U.S. PATENT DOCUMENTS

2004/0207208 A1   10/2004   Mikhail et al.
2009/0121483 A1*   5/2009   Xiong et al. ................... 290/44

FOREIGN PATENT DOCUMENTS

| GB | 2 089 901 | 6/1982 |
| JP | 59-150982 | 8/1984 |
| JP | 2000-14196 | 1/2000 |
| WO | 98/34312 | 8/1998 |
| WO | 00/13304 | 3/2000 |
| WO | 2007/051464 | 5/2007 |
| WO | 2008/145778 | 12/2008 |

OTHER PUBLICATIONS

English Machine Translation of Hald et al. DE 3342583.*
Tapia, G. et al. "Two Alternative Modeling Approaches for the Evaluation of Wind Farm Active and Reactive Power Performances". IEEE Transactions on Energy Conversion 21.4 (2006): 909-920.*
English translation of Takayoshi JP 59-150982 (Aug. 29, 1984).*
Search Report issued in the Danish priority case No. PA 2007 01786; Jul. 15, 2008; 1 page; Denmark Patent and Trademark Office.

* cited by examiner

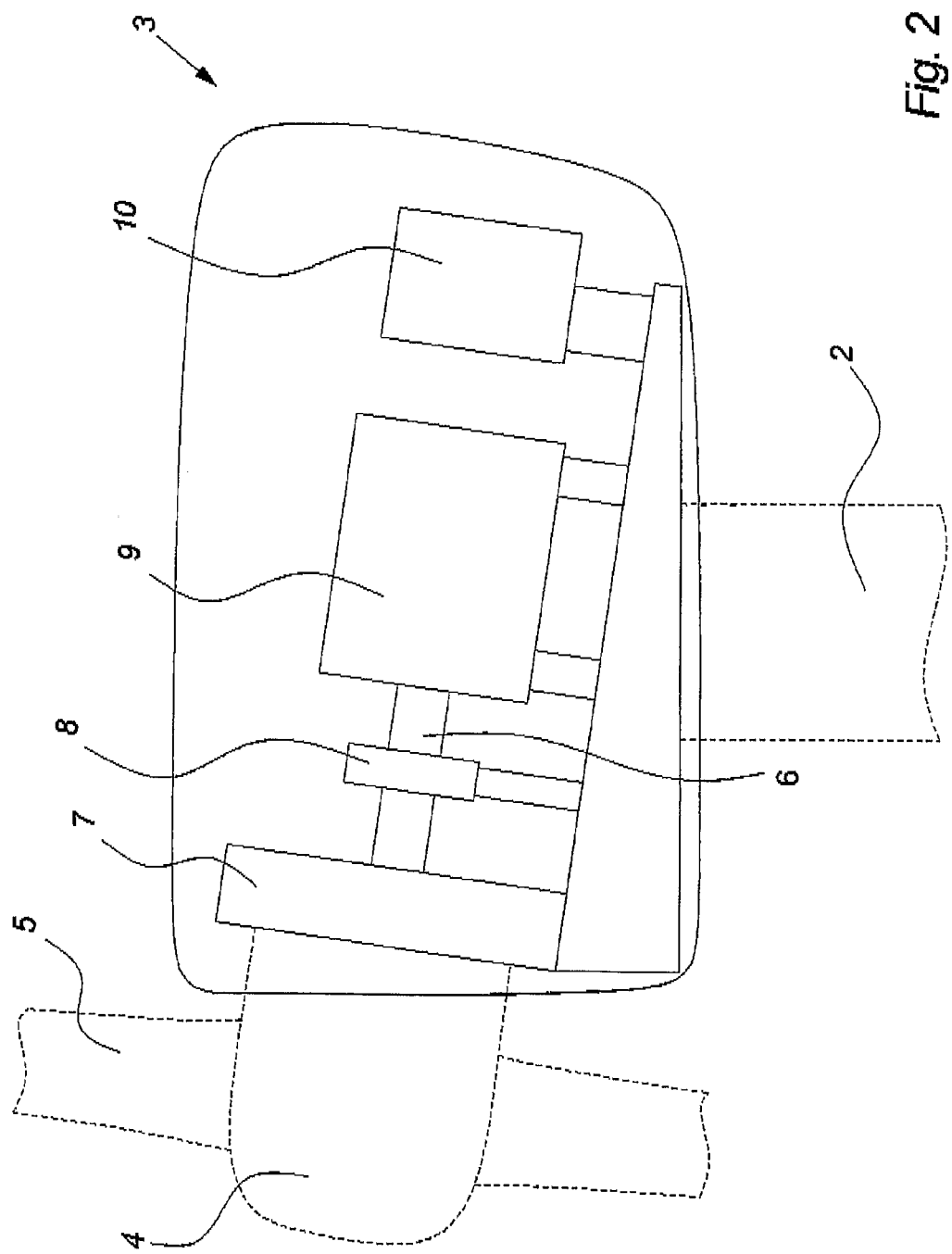

LIFETIME OPTIMIZATION OF A WIND TURBINE GENERATOR BY CONTROLLING THE GENERATOR TEMPERATURE

The present invention relates to a variable speed wind turbine comprising a generator.

BACKGROUND

Thermal stress to components containing or comprising materials of different thermal expansion coefficients is a well-known problem. Within the art of making wind turbines, this problem is particularly pronounced due to the very varying operational and climatic conditions, that many wind turbines are exposed to. Especially electric components, such as the generators of wind turbines, are vulnerable to thermal stress.

Basically, thermal stress originates from two factors, namely high temperatures and, more important, varying temperatures.

Overheating of the windings of a generator does not only reduce the lifetime of the windings due to chemical decomposition of the insulating materials but can also lead to more immediate damage to or even destruction of the windings.

The lifetime of the insulating material depends strongly on the temperature of the material, and, roughly speaking, the lifetime is halved by a temperature raise of approximately 10° C. This is in good accordance with Arrhenius' exponential "law", which is a well-proven theory suggesting that the higher the temperature, the faster a given chemical reaction will proceed. For electrical components, a rule of thumb says that for every 10° C. the temperature is raised, the risk of failures doubles.

Even more important, varying temperatures result in consecutive extensions and contractions of the mechanical parts of the electrical components, which can eventually lead to fatigue of the materials constituting the parts and, thereby, damage to or destruction of the electrical components.

Furthermore, the lifetime of generator windings is reduced because different thermal expansion coefficients of the conducting material, the insulating material and the material surrounding the windings result in decomposition due to mechanical wear of the different materials as they slide against each other, because they expand differently when the temperature changes. Similar effects apply for cables that are exposed to varying temperatures.

The Coffin-Manson model, which is, for instance, described in International Patent Application WO 2007/051464, further discusses some of the relations between temperature variations and lifetime of a material.

Also, the fact, that lubricants and interacting mechanical components are typically made to work optimally at a specific temperature, influences the lifetime of components which are exposed to significant temperature variations. If lubricants are used at temperatures outside the temperature ranges, within which they are made to work optimally, the friction between different lubricated materials as they slide against each other, because they expand differently when the temperature changes and, thereby, the mechanical wear of the materials may be increased.

For the above-mentioned reasons, it is seen that not only should the temperature of the different components, especially the electrical components such as the windings of the generator, be kept below a specified maximum temperature but, optimally, it should be maintained at a fixed predefined, optimal operational temperature.

If this should be accomplished by a heating and cooling system, however, the capacity of this system should be extremely high, and the system would be very expensive in manufacturing and operation as well as in maintenance costs. Furthermore, such a heating and cooling system would be both large and heavy, which is particularly disadvantageous in the field of wind turbines.

Therefore, some kind of control of the operation of the wind turbine is required in order to reduce the thermal stress of the components of the wind turbine.

A normal control strategy for this purpose is to monitor a series of parameters, such as ambient temperature, temperatures of the stator, bearings and cooling fluid of the generator, reactive power production, rotor currents, undervoltage and asymmetric phases on the utility grid, each of which parameters affects the temperatures of the generator.

For instance, it is a well-known and normal procedure to monitor the temperature of the stator in order to be able to intervene by reducing the magnitude of the currents running in the stator before overheating occurs. This monitoring is usually performed using temperature sensors, such as PT100 sensors or other temperature dependent resistors physically positioned within the stator from where the sensor output reaches a control system through simple wiring.

In a similar way, temperatures in the bearings and the cooling fluid of the generator are measured using temperature sensors, typically PT100 and/or the like.

The use of temperature sensors of this type, however, is not very useful for monitoring the rotor temperature because the rotation of the rotor complicates the transmission of the sensor output to a control system. Normally, measurement signals are transmitted from the rotor to the stationary part of the generator through a system of slip rings, but the electrical resistances of such a slip ring system are not constant.

In fact, the variations of the slip ring resistances may, in severe cases, exceed the variations of the resistances of the temperature dependent resistors which makes the use of slip rings unsuitable for rotor temperature monitoring.

Generally, direct rotor temperature monitoring is usually not performed in wind turbine generators and, thus, there is a risk of overheating the rotor windings of the generator. Especially so, because the power in the rotor windings varies during operation of the wind turbine, which makes the variations of the temperature in the rotor difficult to predict if it is not being monitored.

There are at least two major problems related to the commonly used control strategy associated with the above-mentioned monitoring of a series of parameters.

Firstly, the strategy normally consists of derating the power production of the wind turbine, whenever a certain safety limit of a monitored value is reached. The derating continues until another limit is reached, whereupon the wind turbine returns to normal operation. Such a control strategy will prevent the temperature from exceeding a certain maximum value, but at the same time, it causes the temperature to fluctuate within a certain range, if the wind turbine is operating with generator temperatures close to their maximum limits. Thus, overheating but certainly not temperature variations is avoided.

Secondly, the monitored parameters are typically controlled individually. This means that the safety limits set up for the values of a given parameter must be very conservative in order to make sure, that overheating does not occur, because the actual values of other parameters affecting the generator temperature are not taken into consideration. This leads to a non-optimized power production, since the production is derated if only one of the monitored parameters is at a critical level, although the actual generator temperature may be far from critical.

German Patent Application DE 33 42 583 discloses a method of controlling the power uptake of the rotor of a wind turbine by adjusting the rotor blades, as a part of which method it is proposed to monitor the temperature of the generator and to control the power uptake of the rotor as a function of this temperature in such a way that a critical generator temperature is not exceeded.

International Patent Application WO 02/086313 discloses a method for avoiding damp in a wind turbine generator by heating up the generator if the generator temperature is below the ambient temperature. Alternatively, the heating of the generator can be trigged by some kind of humidity sensor.

German Patent Application DE 41 41 837 discloses an apparatus and a method for controlling a generator so as to achieve a larger power output performance without overheating the generator. The method includes measuring the temperature and calculating whether a given maximum temperature has been reached or is close to being reached. If this is the case, the excitation current of the generator is reduced in order not to exceed the maximum temperature.

German Patent Application DE 101 06 944 discloses a method for controlling the temperature of an electric machine. The method prevents a critical temperature from being exceeded at temperature-critical components by the use of control measures involving temperature measurement and/or modeling and regulation to reduce excessive temperatures.

None of the above-mentioned documents mention closed-loop regulation of temperature or the aim of keeping the temperature substantially constant.

An objective of the present invention is to provide an apparatus and a method for providing a control system for the temperature of a wind turbine generator that prevents overheating and reduces significantly the temperature variations and, at the same time, keeps the power production of the wind turbine at its optimum under the given operational and environmental conditions.

BRIEF DESCRIPTION OF THE PRESENT INVENTION

The present invention relates to a wind turbine comprising a wind turbine rotor having one or more blades, a generator coupled to the wind turbine rotor, generator temperature control means having computation means, and means for providing input to the generator temperature control means, the input being representative of at least one temperature of the generator. The generator temperature control means includes a closed-loop regulation arranged to determine a deviation of the input from at least one desired value, compute the magnitude of at least one control output in dependency of the determined deviation, and feed the at least one control output to at least one controller of the wind turbine in order to reduce the deviation. The at least one controller of the wind turbine being fed with the at least one control output from the generator temperature control means comprises control means for controlling the operation of the wind turbine in response to the at least one control output by changing one or more operational parameters of the wind turbine, which parameters influence the at least one temperature of the generator.

Thus, the present invention provides a system for reducing the fluctuations and variations of the temperature of a wind turbine generator, thereby prolonging the lifetime of the components of the generator, especially the rotor windings and the stator windings.

In a preferred embodiment of the invention, the closed-loop regulation is a PI-regulation.

PI-regulation is a well-known and efficient type of closed-loop regulation, which is very suitable for solving regulation problems like the one being solved by the present invention. It should be noted, however, that also other forms of regulations, such as P-regulation and PID-regulation could be used within the scope of the present invention.

In a preferred embodiment of the invention, the means for providing input to the generator temperature control means comprises computation means for calculating an estimate of at least one temperature of the generator from one or more measurable parameters of the generator, such as rotor current, stator current, stator temperature, bearing temperature and/or cooling fluid temperature.

Calculating an estimate of at least one temperature of the generator from one or more measurable parameters of the generator is advantageous in that such parameter values can be made available by simple measurements of a number of relevant electrical or thermal variables. This estimate of at least one temperature may be calculated using a complex thermal model of the generator including thermal capacities and time constants of different parts of the generator, especially the rotor.

It is advantageous to use current as input for the calculation of an estimate of a generator temperature, since accumulative and power related time functions of currents, such as $I(t)^2 t$, that can easily be computed from continuous or discrete sampled measurements of a current, are useful for thermal models of different parts of the generator. The windings of a generator are not first and foremost endangered by very high instantaneous currents during short time periods, but rather by the accumulative effects of relatively high currents over longer time periods. This is due to the fact that the thermal time constant for the iron used to produce the generator is in the magnitude of several minutes, maybe even close to an hour.

The rotating and stationary parts of the generator are thermally connected, as well mechanically as through a common cooling medium, and, therefore, temperatures of stationary parts are useful inputs for a thermal model of the rotating parts of the generator. Because the stator temperatures are easily measured using temperature sensors, such as PT100 sensors or other temperature dependent resistors, which are physically positioned within the stator; and because there is a close albeit rather complex relationship between the stator temperatures and the rotor temperatures of a generator, stator temperatures are useful inputs for the calculation of an estimate of one or more rotor temperatures of the generator.

In an embodiment of the invention, the at least one temperature of the generator includes at least one measured or estimated temperature of the stator of the generator.

In order to optimize the lifetime of the stationary parts of the generator, especially the stator windings, it is advantageous to include one or more stator temperatures in the input to the generator temperature control means. The stator temperatures will typically be measured using PT100 sensors or other temperature dependent resistors.

In an embodiment of the invention, the at least one temperature of the generator includes at least one measured or estimated temperature of the rotor of the generator.

In order to optimize the lifetime of the rotating parts of the generator, especially the rotor windings, it is advantageous to include one or more rotor temperatures in the input to the generator temperature control means. The rotor temperatures will typically by estimated from one or more measured parameters of the generator.

In an embodiment of the invention, the at least one temperature of the generator includes at least one measured or estimated temperature of the cooling fluid of the generator.

Using cooling fluid temperatures and flow measurements as input for the generator temperature control means is advantageous because there is a simple relation between the cooling fluid inlet and outlet temperatures and flow and the amount of heat energy that is removed from the generator system by the cooling fluid, and because these values are easily measured using temperature sensors, such as PT100 sensors or other temperature dependent resistors, and flow sensors, which are physically positioned within the cooling fluid.

In an embodiment of the invention, the wind turbine comprises means for adjusting the pitch of one or more of the blades, and the at least one controller of the wind turbine being fed with the at least one control output from the generator temperature control means includes a pitch controller for controlling the means for adjusting the pitch of one or more of the blades.

Using a pitch controller and means for adjusting the pitch of one or more of the blades is advantageous, since pitch control is a well-known and well-proven way of controlling the operational parameters of a wind turbine generator.

In an embodiment of the invention, the at least one control output includes a power control signal.

Using a power control strategy for controlling the pitch of one or more of the blades and, thereby, the operational parameters of the wind turbine generator is advantageous, because it is a well-known and well-proven way of controlling the operation of a wind turbine generator and, thus, the thermal load on the generator.

In an embodiment of the invention, the at least one control output includes a torque control signal.

Using a torque control strategy for controlling the pitch of one or more of the blades and, thereby, the operational parameters of the wind turbine generator is advantageous, because it is a well-known and well-proven way of controlling the operation of a wind turbine generator and, thus, the thermal load on the generator.

In an embodiment of the invention, the generator is connected to emit electrical power to a utility grid at least partly through a frequency converter, and the at least one controller of the wind turbine being fed with the at least one control output from the generator temperature control means includes a converter controller for controlling the operation of the frequency converter.

A preferred way of controlling the currents and, thus, the temperatures of the generator windings of a wind turbine generator connected to a utility grid through a frequency converter is to change relevant reference values and other control signals sent to the converter in a way that will make the converter change the currents and, if relevant, also the voltages of the generator windings. This applies to doubly-fed induction generators, from which a certain amount of energy may be emitted to the utility grid from the rotor through a frequency generator, as well as to generators having a full-scale converter through which all the power is emitted from the stator to the utility grid.

In an embodiment of the invention, the at least one control output includes a reactive power control signal.

Controlling the reactive power production and, thereby, the thermal load on the generator is advantageous, because it is a well-known and well-proven way of operating a frequency converter connected to a wind turbine generator.

In an embodiment of the invention, the at least one control output includes a phase angle control signal.

In an embodiment of the invention, the at least one control output includes a power factor control signal.

Using a phase angle or power factor control strategy for controlling the frequency converter connected to a wind turbine generator and, thereby, the operational parameters of the generator is advantageous, because it is a well-known and well-proven way of controlling the operation of a generator and, thus, the thermal load on the generator.

It should be noticed, however, that although the above-mentioned strategies of controlling the reactive power, the phase angle and/or the power factor are useful for controlling the thermal loads of a doubly-fed induction generator, they do not apply for generators having a full-scale converter connected to the stator. This is due to the fact, that the reactive power emitted to the utility grid is produced in the grid side of the frequency converter and, thus, does not affect the generator side of the frequency converter from which it is separated by a DC-link. Therefore, only the absolute amount of power produced and not the amount of reactive power nor the phase angle or the power factor of the emitted power influences the thermal load of the generator.

In an embodiment of the invention, the wind turbine comprises means for adjusting the yaw angle of the wind turbine, and the at least one controller of the wind turbine being fed with the at least one control output from the generator temperature control means includes a yaw controller for controlling the means for adjusting the yaw angle of the wind turbine.

Rotating the wind turbine slightly away from the wind direction reduces the amount of power that the wind turbine has to handle and, thus, the thermal load on the generator and other parts of the wind turbine.

In another aspect of the invention, it relates to a method for controlling the temperature of a wind turbine generator comprising the steps of providing input to a generator temperature control means, the input being representative of at least one temperature of the generator, calculating the deviation of the input from at least one desired value, computing at least one control output from the calculated deviation, feeding the at least one control output to at least one controller of the wind turbine in order to reduce the deviation, and controlling the operation of the wind turbine in response to the at least one control output by changing one or more operational parameters of the wind turbine, which parameters influence the at least one temperature of the generator.

Following such a method is an advantageous way of using a wind turbine as described above for controlling the deviation of at least one temperature of the generator from at least one desired value in order to optimize the lifetime of the generator.

In an embodiment of the invention, the at least one controller of the wind turbine includes a pitch controller.

In an embodiment of the invention, the at least one controller of the wind turbine includes a converter controller.

In an embodiment of the invention, the at least one controller of the wind turbine includes a yaw controller.

Some of the advantages of using a pitch controller, a converter controller and/or a yaw controller, respectively, have been described above.

An advantage of the present invention is that it does not depend on the type of generator used in the wind turbine. Thus, it relates to all known types of generators, including synchronous and asynchronous generators, generators having full-scale converters, generators with a permanent magnet, multiphase generators, multipole generators, high-speed generators, low-speed generators, induction generators, such as Doubly-Fed Induction Generators (DFIG) and others.

Obviously, the principles of the present invention could also be applied to other components of a wind turbine than just the generator.

BRIEF DESCRIPTION OF THE FIGURES

Some embodiments of the invention will be described in the following with reference to the figures in which FIG. 2 illustrates a cross section of a simplified nacelle showing the drive train as seen from the side.

The appended figures are provided for illustrating a few embodiments of the present invention and are not intended to limit the scope of protection as defined by the claims.

DETAILED DESCRIPTION

In the following is disclosed some embodiments of the present invention.

Figure 1:
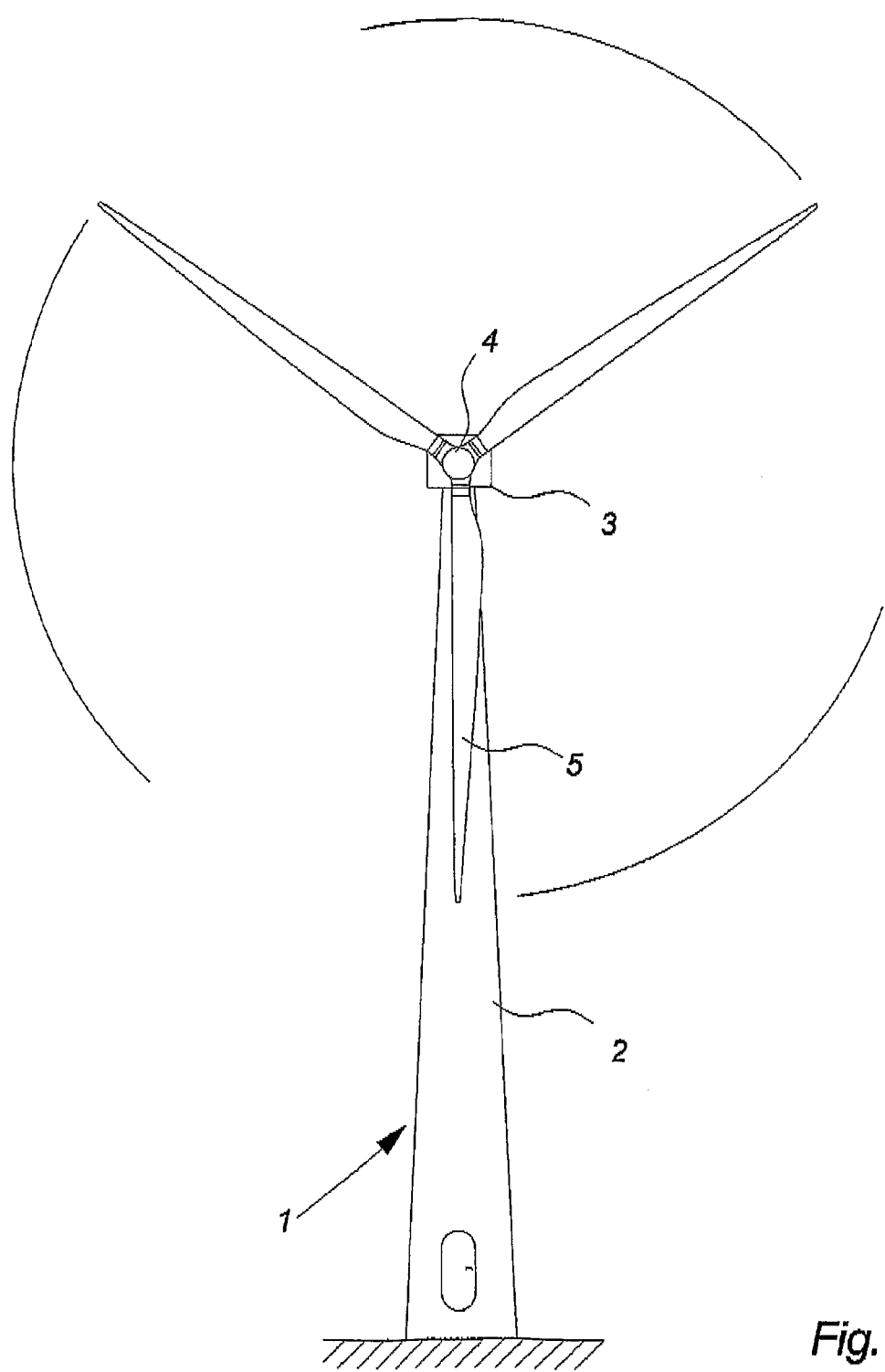
FIG. 1 illustrates a large modern wind turbine as seen from the front.

FIG. 1 illustrates a modern wind turbine 1, comprising a tower 2 and a wind turbine nacelle 3 positioned on top of the tower 2. The wind turbine rotor 4 comprising three wind turbine blades 5 is connected to the nacelle 3 through a low speed shaft (not shown) which extends from the front of the nacelle 3.

FIG. 2 illustrates a simplified cross section of a wind turbine nacelle 3, as seen from the side. In the shown embodiment, the drive train 6 in the nacelle 3 comprises a gear 7, a breaking system 8, a generator 9 and a frequency converter 10. It should be noted that not all wind turbine drive trains 6 include all of the components 7-10 shown in the figure. Depending on the type of generator 9 used in the wind turbine 1, the gear 7 and/or the frequency converter 10 may be absent.

Figure 3A:
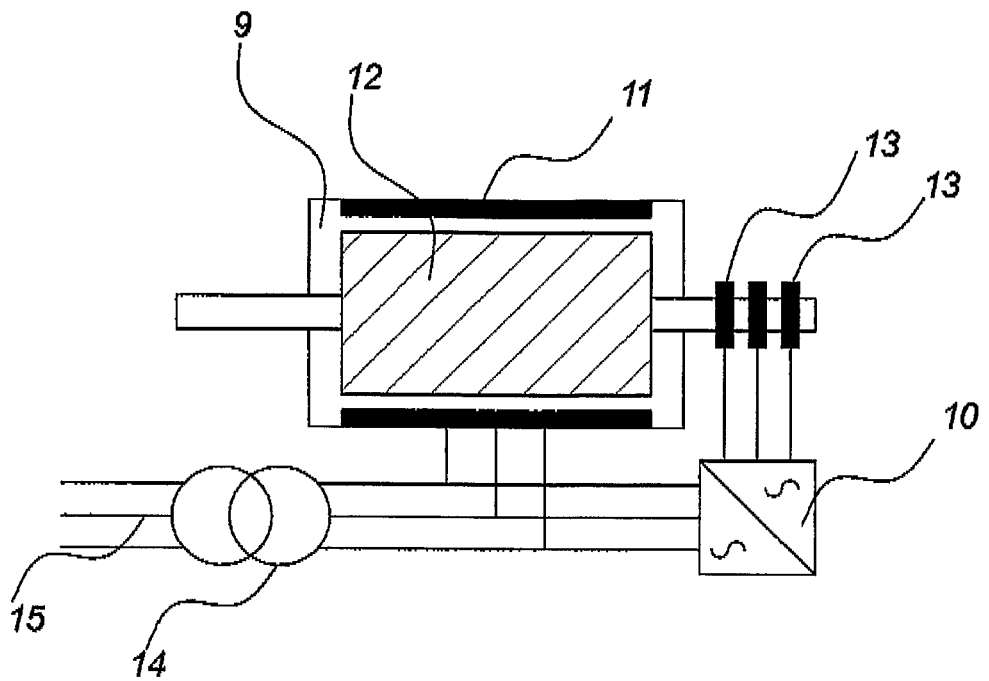
FIG. 3a illustrates the principle schematics of a standard doubly-fed induction generator.

An example of a generator 9 which is connected to a utility grid 15 partly through a frequency converter 10 is a standard doubly-fed induction generator 9, the principle schematics of which is illustrated in FIG. 3a. In this case, the stator 11 is connected to the grid 15 via a grid transformer 14 and the rotor 12 is connected to the grid 15 via slip rings 13, a frequency converter 10 and the grid transformer 14.

Figure 3B:
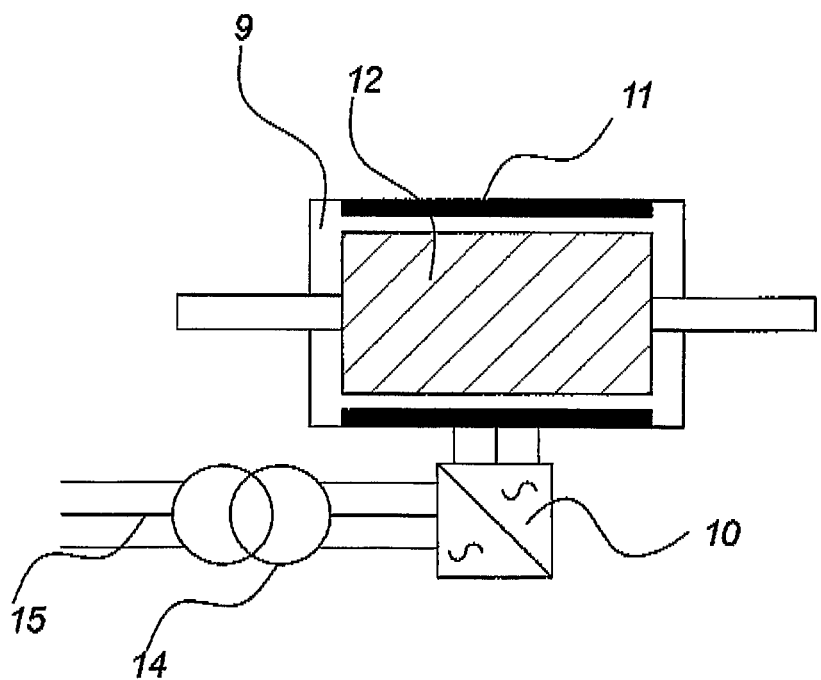
FIG. 3b illustrates the principle schematics of a generator, such as an induction generator, a synchronous generator or a permanent magnet generator, having a full-scale converter.

Similar schematics for another type of generator 9 are shown in FIG. 3b. Here, the stator 11 is connected to the grid 15 via a frequency converter 10 and a grid transformer 14. The generator 9 can be of any type that is suitable for being connected with a full-scale converter 10, such as an induction generator 9, a synchronous generator 9 or a permanent magnet generator 9.

For synchronous generators 9 with electrically excited rotor fields, the rotor currents 18 are controlled by an exciter (not shown), through which they can also be measured.

Permanent magnet generators 9 generally comprise two main components, namely a rotating magnetic field constructed using permanent magnets and a stationary armature constructed using electrical windings located in a slotted iron core.

Permanent magnets are typically made out of ferro- (or ferri-)magnetic materials, such as NdFeB, SiFe, SrFeO or the like, If a ferromagnetic material is exposed to temperatures above its specific Curie temperature, it loses its characteristic magnetic ability as thermal fluctuations destroy the alignment of the magnetic domains of the material.

Figure 4A:
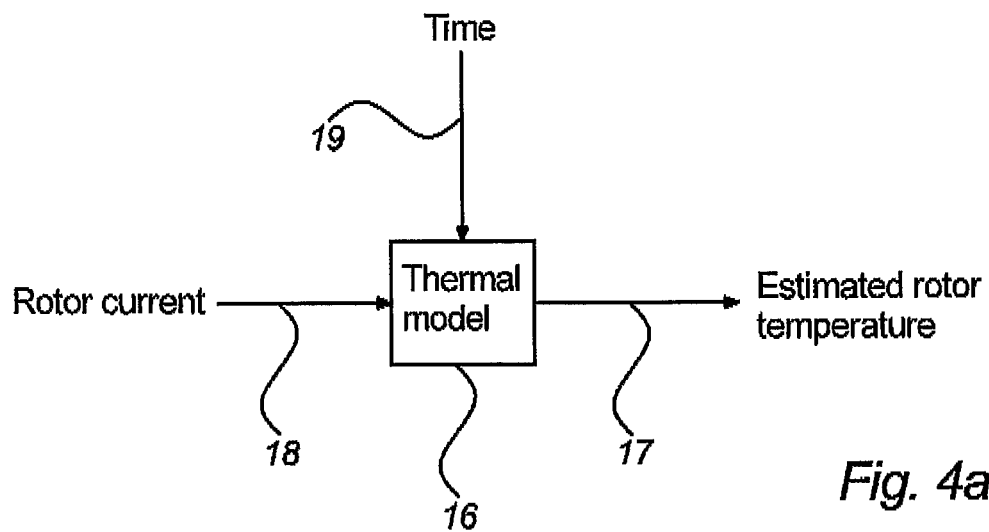
FIG. 4a illustrates the overall schematics of a simple thermal model for calculating an estimate of the rotor temperature of a generator.

FIG. 4a shows the overall schematics of an example of a simple thermal model 16 which cart be used by the means for providing input to the generator temperature control means 22 to calculate an estimated rotor temperature 17 from measured rotor currents 18 and the time 19 alone.

Figure 4B:
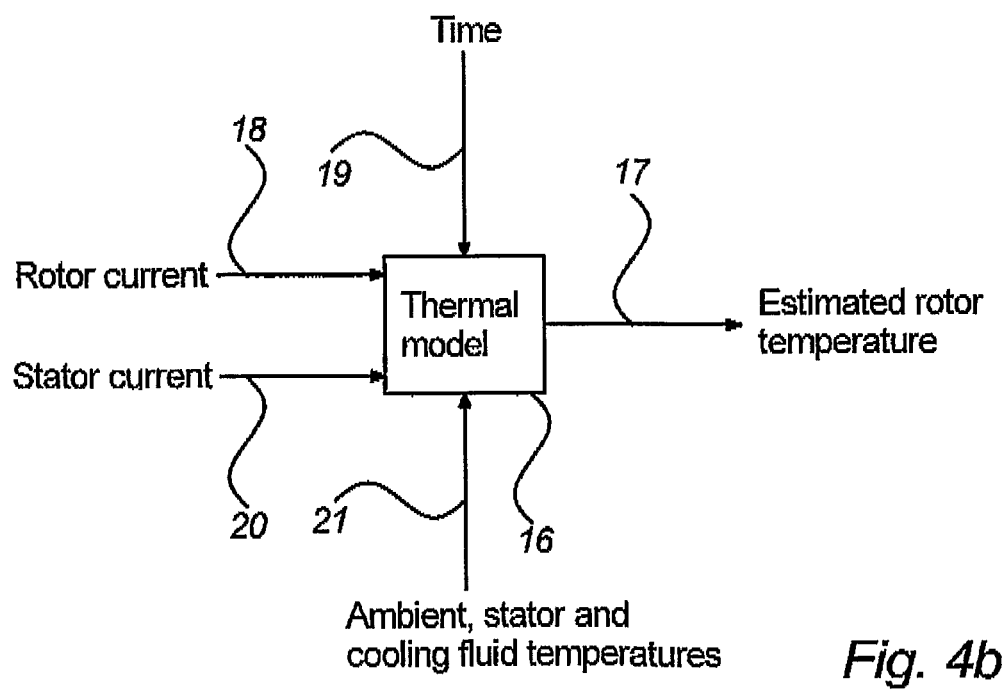
FIG. 4b illustrates the overall schematics of a more complex thermal model for calculating an estimate of the rotor temperature of a generator.

The overall schematics of a more complex thermal model 16 are illustrated in FIG. 4b. Here, the estimated rotor temperature 17 is not only calculated from rotor currents 18 and time 19 but also from stator currents 20 and measured temperatures 21 from the surroundings, the stator 11 and the cooling fluid of the generator 9.

Figure 5:
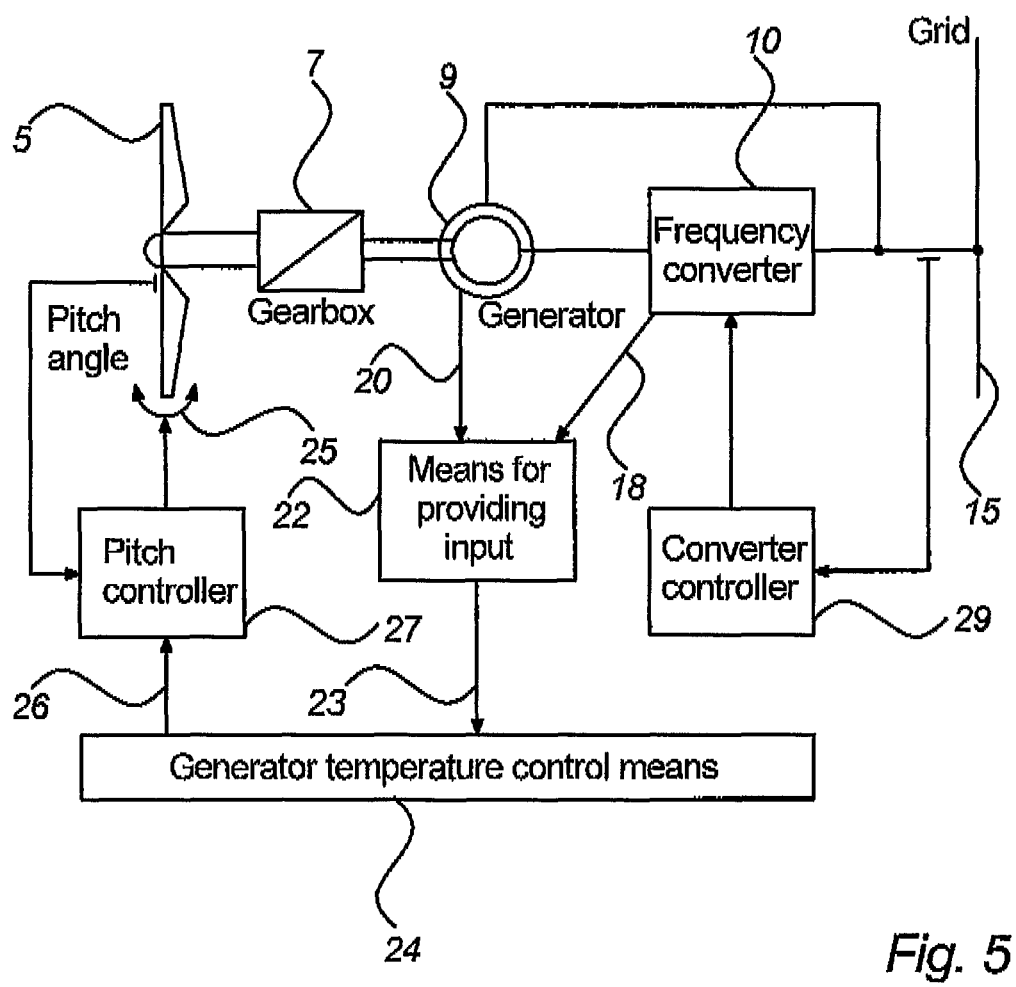
FIG. 5 illustrates the simplified schematics of an embodiment of the present invention using a pitch controller to control at least one temperature of a doubly-fed induction generator.

FIG. 5 illustrates the simplified schematics of an embodiment of the invention. Rotor currents 18 are measured within the frequency converter 10 and fed to the means for providing input to the generator temperature control means 22 along with stator currents 20 measured within the generator 9. The means for providing input to the generator temperature control means 22 can also receive other inputs which are not shown in the figure, such as temperature measurements 21 from the stator 11, the bearings and/or the cooling fluid of the generator 9 and from the environment.

The means for providing input to the generator temperature control means 22 calculates at least one input 23 which is fed to the generator temperature control means 24, which computes the magnitude of an appropriate control output 26 and feeds it to the pitch controller 27. The control output 26 can include a power control signal and/or a torque control signal.

The magnitude of the control output 26 is calculated according to a closed-loop PI-regulation included in the generator temperature control means 24 to cause the pitch controller 27 to adjust the pitch angle 25 of one or more wind turbine blades 5. This is done in a way that changes the power production and/or the torque of the generator 9 in order to keep at least one temperature of the generator 9 as close to a desired value as possible.

Figure 6:
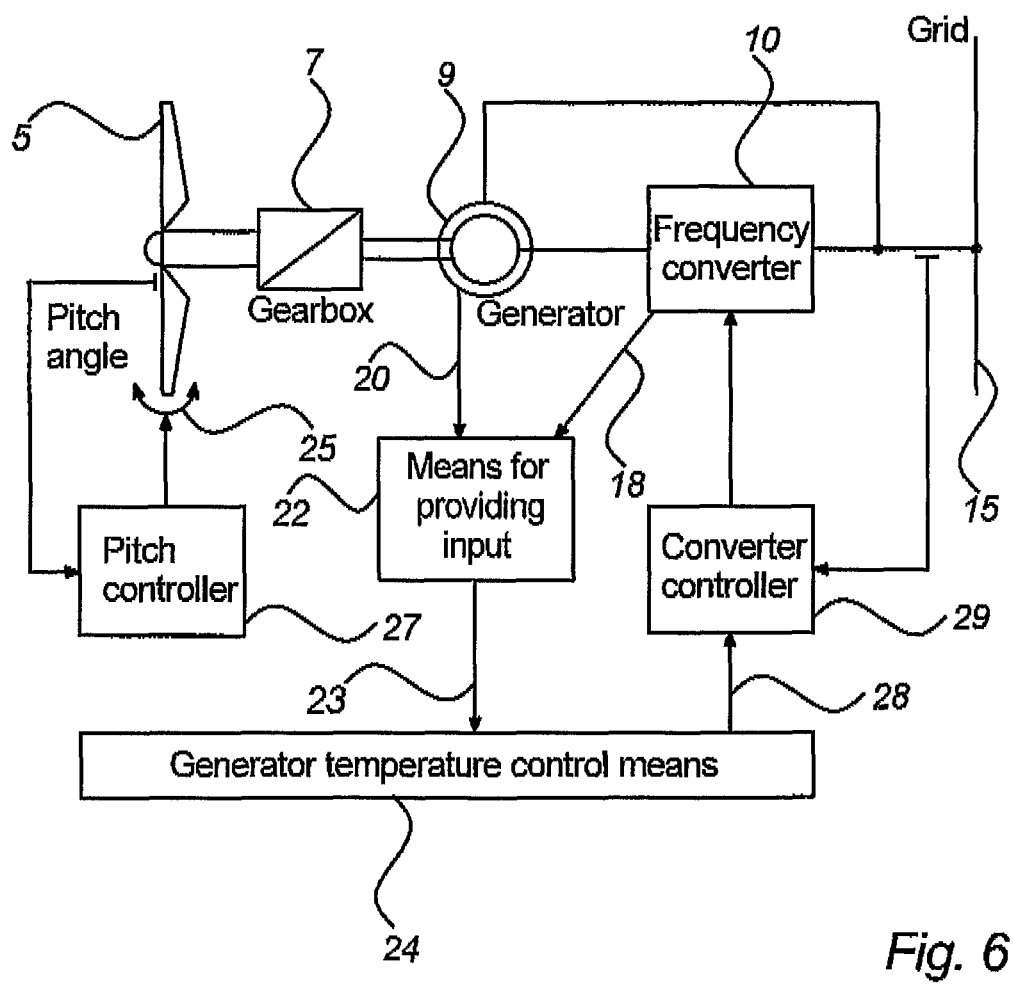
FIG. 6 illustrates the simplified schematics of an embodiment of the present invention using a converter controller to control at least one temperature of a doubly-fed induction generator.

FIG. 6 illustrates the simplified schematics of another embodiment of the invention. Like in the previously shown embodiment, rotor currents 18 are measured within the frequency converter 10 and fed to the means for providing input to the generator temperature control means 22 along with stator currents 20 measured within the generator 9. The means for providing input to the generator temperature control means 22 can also receive other inputs which are not shown in the figure, such as temperature measurements 21 from the stator 11, the bearings and/or the cooling fluid of the generator 9 and from the environment.

The means for providing input to the generator temperature control means 22 calculates at least one input 23 which is fed to the generator temperature control means 24, which computes the magnitude of an appropriate control output 28 and feeds it to the converter controller 29. The control output 28 can include a reactive power control signal, a phase angle signal and/or a power factor signal.

The magnitude of the control output 28 is calculated according to a closed-loop PI-regulation included in the generator temperature control means 24 to cause the converter controller 29 to adjust the settings of the frequency converter 10. This is done in a way that changes the reactive power production and/or the phase angle or the power factor of the generator 9 in order to keep at least one temperature of the generator 9 as close to a desired value as possible.

Figure 7:
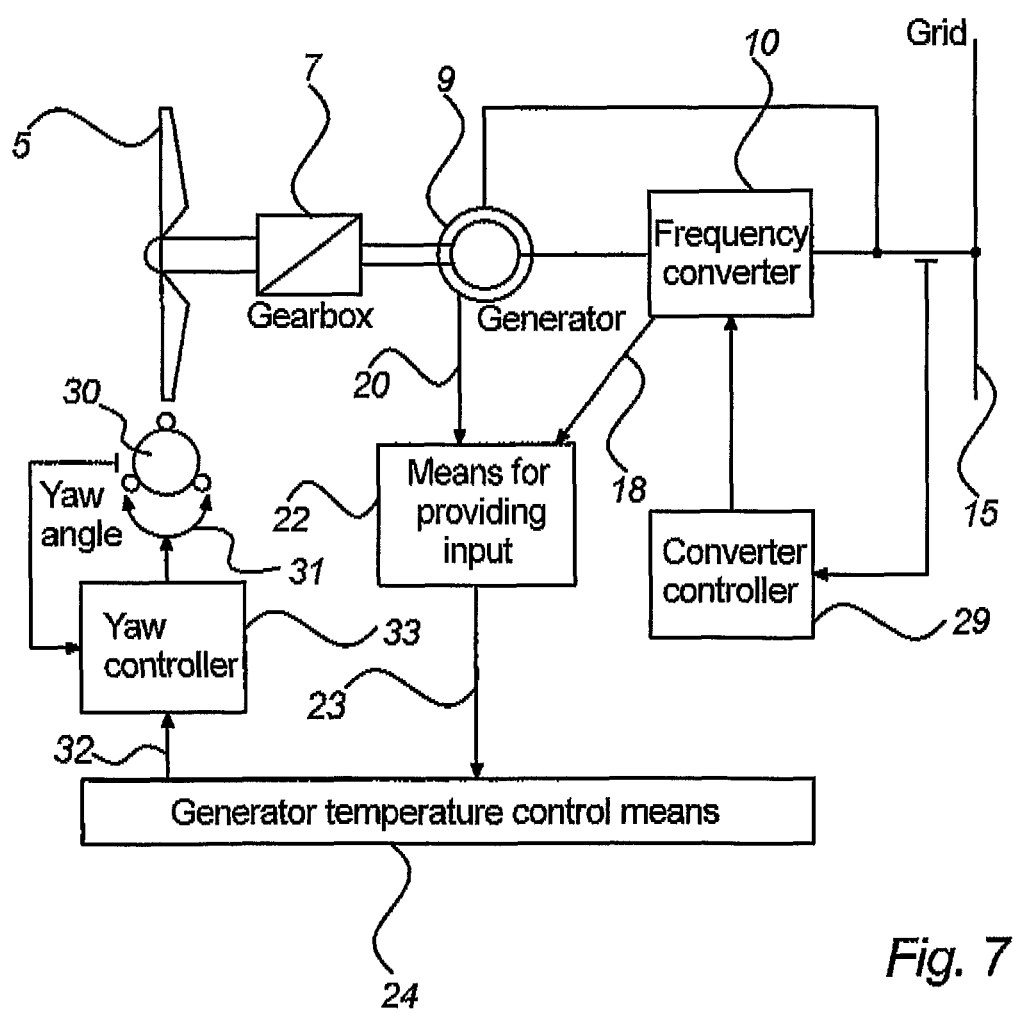
FIG. 7 illustrates the simplified schematics of an embodiment of the present invention using a yaw controller to control at least one temperature of a doubly-fed induction generator.

FIG. 7 illustrates the simplified schematics of yet another embodiment of the invention. Like in the previously shown embodiments, rotor currents 18 are measured within the frequency converter 10 and fed to the means for providing input to the generator temperature control means 22 along with stator currents 20 measured within the generator 9. The means for providing input to the generator temperature control means 22 can also receive other inputs which are not shown in the figure, such as temperature measurements 21 from the stator 11, the bearings and/or the cooling fluid of the generator 9 and from the environment.

The means for providing input to the generator temperature control means 22 calculates at least one input 23 which is fed to the generator temperature control means 24, which computes the magnitude of an appropriate control output 32 and feeds it to the yaw controller 33. The control output 32 can include a power control signal and/or a torque control signal.

The magnitude of the control output 32 is calculated according to a closed-loop PI-regulation included in the generator temperature control means 24 to cause the yaw controller 33 to adjust the yaw angle 31 of the yaw mechanism 30 of the wind turbine 1. This is done in a way that changes the power production and/or the torque of the generator 9 in order to keep at least one temperature of the generator 9 as close to a desired value as possible.

In all of the embodiments of the invention shown in FIGS. 5-7, a DFIG system is used, in which the frequency converter 10, the converter controller 29 and the stator 11 of the generator 9 are all connected to the grid 15.

Figure 8:
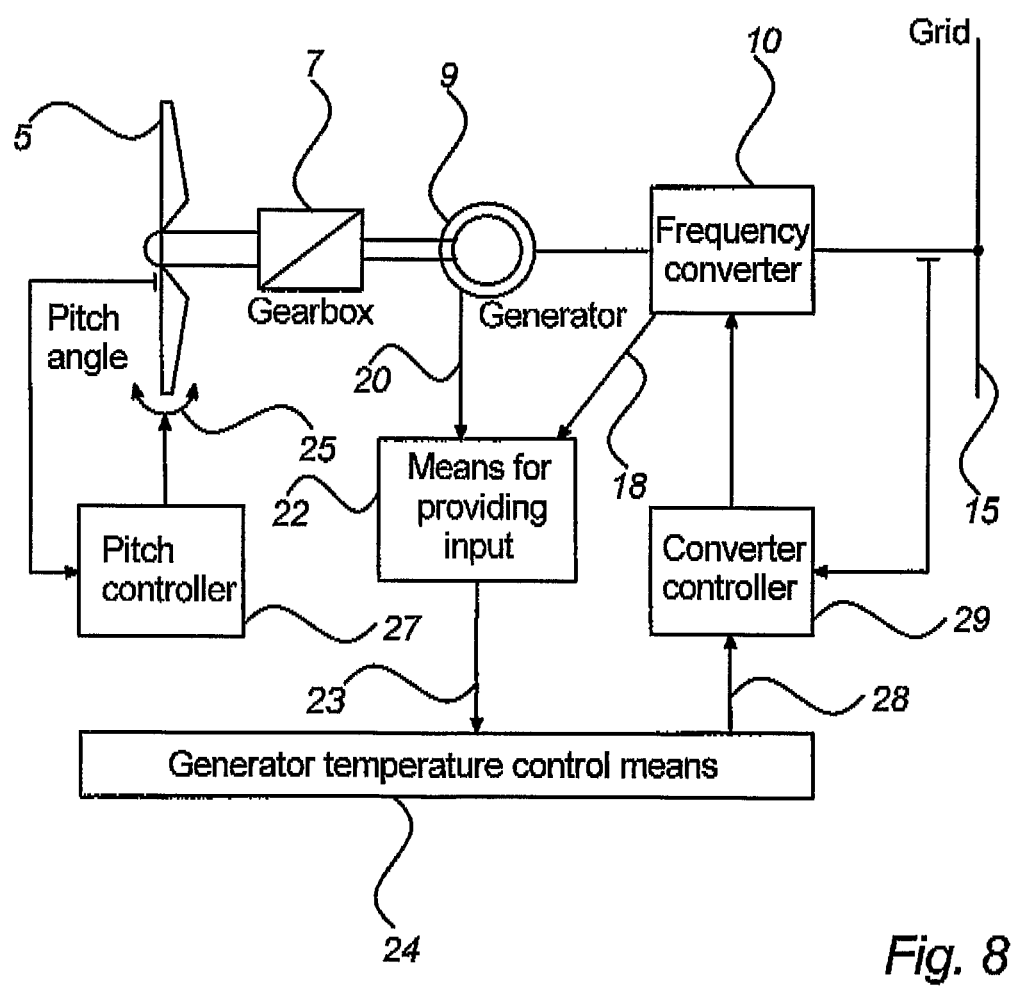
FIG. 8 illustrates the simplified schematics of an embodiment of the present invention using a converter controller to control at least one temperature of a generator equipped with a full-scale converter.

FIG. 8 illustrates an embodiment of the invention which resembles the embodiment shown in FIG. 6. The main difference is that the generator 9 illustrated in FIG. 8 is equipped with a full-scale converter 10, through which the stator 11 of the generator 9 is connected to the grid 15, while the rotor 12 of the generator is not connected to the grid.

The generator 9 illustrated in FIG. 8 can be of any type that is suitable for being connected with a full-scale converter 10, such as an induction generator 9, a synchronous generator 9 or a permanent magnet generator 9.

In this case, stator currents 20 are measured within the frequency converter 10 and/or within the generator 9 and fed to the means for providing input to the generator temperature control means 22. The means for providing input to the generator temperature control means 22 can also receive other inputs which are not shown in the figure, such as temperature measurements 21 from the stator 11, the bearings and/or the cooling fluid of the generator 9 and from the environment.

The means for providing input to the generator temperature control means 22 calculates at least one input 23 which is fed to the generator temperature control means 24, which computes the magnitude of an appropriate control output 28 and feeds it to the converter controller 29. The control output 28 can include a reactive power control signal, a phase angle signal and/or a power factor signal.

The magnitude of the control output 28 is calculated according to a closed-loop PI-regulation included in the generator temperature control means 24 to cause the converter controller 29 to adjust the settings of the frequency converter 10. This is done in a way that changes the reactive power production and/or the phase angle or the power factor of the generator 9 in order to keep at least one temperature of the generator 9 as close to a desired value as possible.

REFERENCE LIST

In the drawings the reference numbers and symbols refer to:
1. Wind turbine
2. Wind turbine tower
3. Wind turbine nacelle
4. Wind turbine rotor
5. Wind turbine blade
6. Drive train
7. Gear
8. Breaking system
9. Generator
10. Frequency converter
11. Stator
12. Rotor
13. Slip rings
14. Grid transformer
15. Grid
16. Thermal model
17. Estimated rotor temperature
18. Rotor currents
19. Time
20. Stator currents
21. Ambient, stator and cooling fluid temperatures
22. Means for providing input to the generator temperature control means
23. Input to the generator temperature control means
24. Generator temperature control means
25. Pitch angle
26. Control output for pitch controller
27. Pitch controller
28. Control output for converter controller
29. Converter controller
30. Yaw mechanism
31. Yaw angle
32. Control output for yaw controller
33. Yaw controller

The invention claimed is:
1. A wind turbine, comprising:
a wind turbine rotor comprising one or more blades,
a generator coupled to the wind turbine rotor,
a yaw actuator configured to adjust a yaw angle of the wind turbine,
a generator temperature controller, and
an estimator configured to estimate a temperature of the generator using a measured value of at least one of stator and rotor currents associated with the generator and provide the estimated temperature to the generator temperature controller, wherein the generator temperature controller includes a closed-loop regulation arranged to determine a deviation of the estimated temperature from at least one desired value, compute the magnitude of at least one control output in proportion to the determined deviation, and provide the at least one control output to at least one controller of the wind turbine in order to reduce the determined deviation, and the at least one controller of the wind turbine comprises control logic configured to control the operation of the yaw actuator in response to the at least one control output by changing the yaw angle of the wind turbine which influences the at least one temperature of the generator.

2. The wind turbine according to claim 1, wherein the closed-loop regulation is a PI-regulation.

3. The wind turbine according to claim 1, wherein the estimator is configured to determine an estimate of at least one temperature of the generator from a plurality of measurable parameters of the generator.

4. The wind turbine according to claim 1, wherein the wind turbine comprises pitch actuators configured to adjust the pitch of one or more of the blades, and the at least one controller includes a pitch controller for controlling the pitch actuators.

5. The wind turbine according to claim 4, wherein the at least one control output includes at least one of a power control signal and a torque control signal.

6. The wind turbine according to claim 1, wherein the generator is connected to emit electrical power to a utility grid at least partly through a frequency converter, and the at least one controller of the wind turbine includes a converter controller for controlling the operation of the frequency converter.

7. The wind turbine according to claim 6, wherein the at least one control output includes at least one of a reactive power control signal, a phase angle control signal, and a power factor control signal.

8. The wind turbine according to claim 1, wherein the at least one control output includes at least one of a power control signal and a torque control signal.

9. A method for controlling a temperature of a wind turbine generator, comprising:
    estimating a temperature of the generator using a measured value of at least one of stator and rotor currents;
    providing the estimated temperature to a generator temperature controller,
    calculating a deviation of estimated temperature from at least one desired value,
    computing at least one control output from the deviation,
    feeding the at least one control output to at least one controller of the wind turbine in order to reduce the deviation, and
    controlling the operation of a yaw actuator of the wind turbine in response to the at least one control output by changing the yaw angle of the wind turbine which influences the at least one temperature of the generator.

10. The method according to claim 9, wherein the at least one controller of the wind turbine includes at least one of a pitch controller, a converter controller, and a yaw controller.

11. The method according to claim 9, further comprising computing the magnitude of the at least one control output in proportion to the deviation.

* * * * *